US008542586B2

(12) United States Patent
Chen et al.

(10) Patent No.: US 8,542,586 B2
(45) Date of Patent: Sep. 24, 2013

(54) PROPORTIONAL BANDWIDTH SHARING OF THE EXCESS PART IN A MEF TRAFFIC PROFILE

(75) Inventors: Minghua Chen, Coquitlam (CA); Desmond Yan, Vancouver (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 192 days.

(21) Appl. No.: 13/237,745

(22) Filed: Sep. 20, 2011

(65) Prior Publication Data

US 2013/0070592 A1    Mar. 21, 2013

(51) Int. Cl.
*H04L 12/26* (2006.01)
*H04L 12/28* (2006.01)
*H04L 12/56* (2006.01)
*G06F 11/00* (2006.01)
*H04Q 7/20* (2006.01)

(52) U.S. Cl.
USPC ............ 370/230; 370/225; 370/395; 455/454

(58) Field of Classification Search
None
See application file for complete search history.

(56) References Cited

U.S. PATENT DOCUMENTS

| | | |
|---|---|---|
| 2003/0202467 A1 | 10/2003 | Bruckman et al. |
| 2005/0271084 A1 | 12/2005 | Bruckman et al. |
| 2007/0253438 A1* | 11/2007 | Curry et al. .................. 370/412 |
| 2008/0176577 A1* | 7/2008 | Bourlas et al. ............... 455/454 |
| 2008/0219268 A1* | 9/2008 | Dennison ................... 370/395.2 |

OTHER PUBLICATIONS http://metroethernetforum.org/PDF_Documents/Bandwidth-Profiles-for-Ethernet-Services.pdf, Retrieved Jun. 6, 2011.
Scheduling Buffer Management. http://www.cs.tau.ac.il/-mansour/networking-2005/lcc4.ppt., retrieved on Apr. 13, 2011.
"Technical Specification MEF 6.1 Ethernet Services Definitions—Phase 2", Apr. 30, 2008; pp. 1-59; XP55037965; Retrieved from the Internet: URL:http://metroethernetforum.org/PDF_Documents/technical-specifications/MEF6-1.pdf.
Xiaoming, He , et al., "Transporting Metro Ethernet Services over Metropolitan Area Networks", Sensor Networks, Ubiquitous, and Trustworthy Computing, 2006, IEEE International Conference on Taichung, Taiwan; Jun. 2006; vol. 2, pp. 178-185.

* cited by examiner

*Primary Examiner* — Andrew Chriss
*Assistant Examiner* — Ajit Reddy
(74) *Attorney, Agent, or Firm* — Blakely, Sokoloff, Taylor & Zafman (57) ABSTRACT

A method and apparatus to shape packet traffic rates of packets in-transit from a plurality of channels to a port, monitor a status of each queue, subtract a CIR from a port load value when an empty queue becomes active, add the CIR to the port load value when an active queue becomes empty, add a difference between an EIR and the CIR for a channel to a port excess value when a queue of the channel becomes excess, subtract the difference for the channel from the port excess value when the excess queue for the channel becomes not excess, calculate an oversubscription ratio based on the port load value and port excess value, calculate a shaping rate for each of the plurality of channels, and shape the traffic for each of the plurality channels using the shaping rate.

13 Claims, 4 Drawing Sheets

PROPORTIONAL BANDWIDTH SHARING OF THE EXCESS PART IN A MEF TRAFFIC PROFILE

CROSS-REFERENCE TO RELATED APPLICATIONS

Cross-reference is made to a co-pending patent application by Minghua Chen and Desmond Yan for "SCHEDULING UNDER CONGESTION WITH TRAFFIC LOAD-BASED SCALING" having Ser. No. 13/209,319, filed on Aug. 12, 2011 and commonly owned. The cross-referenced application is incorporated herein by reference.

FIELD

Embodiments of the invention relate to the field of scheduling packets in computer networks. Specifically, the embodiments of the invention relate to reducing congestion using a proportional shaping of channel traffic load for a Metro Ethernet network using bandwidth parameters of a Metro Ethernet Forum (MEF) traffic profile.

BACKGROUND

When a packet communication network becomes congested, ports that supply packets through the communications infrastructure can end up dropping one or more packets in a stream. This can result in errors at the receiving end of a connection. In some networks, however, when a single packet is dropped an entire block of packets may be resent in order to recover from the error. Resending all of the packets in a block in order to recover a single or a few dropped packets adds more traffic and can make the congestion worse.

At the same time, packet traffic is often bursty in that for short time packets will arrive at a port very quickly, then no packets or only a few packets will arrive. In many cases, this bursty pattern is caused by typical user behavior. An Internet browser, for example, might request a web page causing a server to send all of the packets necessary to transfer the web page. The user then views the web page after it is received and makes no requests for a time.

To take advantage of this typical traffic pattern, traffic is throttled at some ports so that during busy periods traffic is buffered and packets are sent at a slower rate than is requested. The extra packets continue to be sent during a normally quiet period until all of the buffers are emptied. This type of throttling requires choices to be made between packets that are urgent or higher priority and those that are less urgent or lower priority. It also requires a scheduler to reduce the rate at which packets are applied to the port in order to prevent any from being dropped. There are many different approaches to scheduling which try to determine which packets should be sent first.

A Round-Robin (RR) and Weighted-Round-Robin (WRR) scheduler picks packets based on a weight assigned to a channel. Bandwidth share is maintained according to weights. Decisions are made on the basis of packets. RR scheduling is used to maintain the relative shares among channels in both non-congested and congested conditions. However, it does not assign a fixed-rate to a channel. This allows any subscriber to use as much bandwidth as is available. Weights can be assigned to channels to give channels different levels of relative shares.

A Deficit-Round-Robin (DRR) scheduler runs in rounds based on a fixed time interval. A channel is added by a certain number of credits or counts in each round. The current number of credits of a channel is the same as the number of bytes or bits the channel is eligible to send. The scheduler picks packets from channels that have enough credits to cover the size of the packet. Traffic is measured in units of bits or bytes rather than in packets, thus DRR maintains bandwidth fairness among channels on the basis of bits-per-second. In contrast, RR and WRR maintain fairness among channels on the basis of the number-of-packets.

With credit-based systems, channels are refilled with credits as time goes by. This changes the round-robin behavior from packet-based scheduling to bandwidth-based scheduling. This also gives the ability for service providers to cap subscriber bandwidths to fixed amounts. Generalized Process Sharing (GPS), Weighted-Fair-Queuing (WFQ), and Worst-Case-Fair-Weighted-Fair-Queuing (WF2Q) are all based on DRR, and are bit-based algorithms.

In a Metro Ethernet Forum (MEF) bandwidth profile, the service requirements for traffic are characterized by a committed information rate (CIR), committed burst size (CBS), an excess information rate (EIR) and an excess burst size (EBS). Each port services subscribers based on the CIR, which defines a minimum rate of traffic forwarding for each channel. The aggregate of all CIRs for the channels of a port is configured to be less than the rate at which the port can service traffic. If port traffic is not fully utilized then the channels of the port can transmit traffic at a rate less than or equal to the EIR, but there is no traffic rate guarantee between the CIR and EIR. For Metro Ethernet systems, the RR and WRR based scheduling can be adapted to schedule selection of packets for transmission through the port by selecting packets based on a weight assigned to a channel to thereby maintain bandwidth share according to these assigned weights. CIR and EIR based traffic scheduling allocates channel weights proportionate to the channel CIR. On each channel a rate limiter is enforced to ensure that no channel exceeds its EIR.

SUMMARY

A method implemented in a network element to shape packet traffic rates of packets in-transit from a plurality of channels to a port within the network element, the port shared by the plurality of channels for transmitting the packets, the method including initializing a port load value and port excess value for the port, the port load value to track load for the port across the plurality of channels and the port excess value to track use of bandwidth on the port between a committed information rate (CIR) and an excess information rate (EIR) across the plurality of channels, receiving packets through each of the plurality of channels and storing the received packets in a respective queue for each channel, monitoring a status of each queue as empty or not empty, monitoring a status of each queue as excess or not excess, wherein excess is a state where a threshold number of packets has been stored in a queue for a channel, subtracting a CIR from the port load value when an empty queue becomes active by storing at least one packet, adding the CIR to the port load value when an active queue becomes empty, adding a difference between an EIR and the CIR for a channel to the port excess value when a queue of the channel becomes excess by meeting the threshold number, subtracting the difference between the EIR and the CIR for the channel from the port excess value when the excess queue for the channel becomes not excess, calculating an oversubscription ratio based on the port load value and port excess value, calculating a shaping rate for each of the plurality of channels by distributing a difference in CIR and EIR for a port across the plurality of channels by applying an over-subscription ratio for each channel, and shaping the traffic for each of the plurality channels using the shaping rate for bandwidth allocation.

A network element to shape packet traffic rates of packets in-transit from a plurality of channels to a port within the network element, the port shared by the plurality of channels for transmitting the packets, the network element including a plurality of channel interfaces to receive packets, a plurality of packet queues coupled respectively to each channel interface to buffer packets received at the channel interfaces, a port coupled to the queues to transmit received packets from the queues, and a shape rate calculation module to initialize a port load value and port excess value for the port, the port load value to track load for the port across the plurality of channels and the port excess value to track use of bandwidth on the port between a committed information rate (CIR) and an excess information rate (EIR) across the plurality of channels, the shape rate calculation module to monitor a status of each queue as empty or not empty, to monitor to a status of each queue as excess or not excess, to subtract a CIR from the port load value when an empty queue becomes active by not being empty, to add the CIR to the port load value when an active queue becomes empty, to add a difference between an EIR and the CIR to the port excess value when an queue becomes excess by meeting the threshold number, to subtract the difference between the EIR and the CIR from the port excess value when an excess queue becomes not excess, and to calculating a shaping rate for each of the plurality of channels by distributing a difference in CIR and EIR for a port across the plurality of channels by applying an over-subscription ratio for each channel, and a scheduler to shape the traffic for each of the plurality channels using the shaping rate for bandwidth allocation.

BRIEF DESCRIPTION OF THE DRAWINGS

The present invention is illustrated by way of example, and not by way of limitation, in the figures of the accompanying drawings in which like references indicate similar elements. References to "one embodiment," "an embodiment," "an example embodiment," and similar language, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

In the following description the terms 'port' and 'channel' may be used. In network service systems, data is transferred in the form of packets. The physical transport carrier is referred to as a port. For example, in an edge router, there can be a 100M Ethernet port to connect to an up-stream router, while another two 10M Ethernet ports can be used to connect to two subscribers. A port can be divided into channels. As an example, the up-stream 100M Ethernet port could be divided into 2 channels, one for each down-stream subscriber. This is a typical case where multiple subscribers share the bandwidth of a port. Port and channel are used herein to indicate the higher and lower levels of traffic processing.

In the following description the term 'congestion' may be used. In a router, traffic comes in from some ingress (incoming) ports (each a separate channel) and will be routed to egress (out bound) ports. When traffic from multiple incoming channels is routed to the same egress port, the aggregated traffic can exceed the egress port bandwidth. When this happens, the egress port is considered 'congested.' Under this congestion condition some packets are dropped in the router.

In the following description the terms 'queuing,' 'scheduling,' and 'shaping' may be used. These are the traffic handling elements in a router. A queue is used to buffer incoming packets and perform logic based dropping of packets. In the examples herein, there is one queue per channel; however any number or combination of queues could be utilized. A scheduler is used to determine from which queue (i.e., which channel) a packet will be selected to be sent to the egress port, referred to herein simply as the 'port.' When looking at one traffic carrying unit (a channel or a port), the scheduler is also referred to as a shaper, in the sense that it shapes the rough incoming traffic pattern into a smooth out-going traffic pattern. By smooth, it is meant that the traffic conforms to a certain pre-defined set of service level agreements. For example, a channel shaper on a 1.5M subscriber channel will shape the traffic into a smooth 1.5M packet stream. A port shaper on a 100M Ethernet port will shape the aggregated out-going traffic from multiple channels to the port rate. Queuing, scheduling, and shaping are used herein to refer generally to techniques used to handle traffic.

In the following description the term 'fairness' may be used. Fairness is a goal to measure how a scheduler performs to give each individual channel a fair share of the bandwidth. For channels with different bandwidth allocations fair refers to a proportional share of bandwidth in accordance with the assigned channel bandwidth configuration reflecting the CIR and EIR of each channel.

In the following description the terms committed information rate (CIR) and excess information rate (EIR) may be used. These terms are related to the Metro Ethernet bandwidth profile defined by the Metro Ethernet Forum (MEF), which describes service requirements for traffic in Metro Ethernet in terms of the bandwidth parameters CIR, EIR, committed burst size (CBS) and excess burst size (EBS), of which the CIR and EIR are relevant to the traffic handling described herein.

The embodiments of the invention provide a method and system for avoiding the disadvantages of the prior art. A standard WRR scheduler provides bandwidth sharing proportional to the CIR of each channel only and uses a rate limiter to enforce EIR. However, under congestion conditions for a port, the high-paying/high bandwidth allotted customers should have their traffic constrained in proportion to their allotted bandwidth, where this allotted bandwidth encompasses both the CIR and the EIR of the channel corresponding to the customer. Also, the use of a rate limiter solely for EIR enforcement on each channel utilizes a significant amount of hardware and software resources inefficiently.

The embodiments of the invention overcome these disadvantages of the prior art. The embodiments provide a process and apparatus for computing the instant traffic loads of a port with minimum computational cost. The embodiments provide a process and apparatus that apply these traffic loads to the scheduling process. A single rate-based shaper/scheduler can be used to achieve the same effect as a more complex schedule (e.g., a WRR scheduling including a rate limiter). The single rate based scheduler also maintains the proportional sharing among channels based on the difference between the EIR and CIR for each channel. The embodiments of the invention thereby provide a computationally simple process for real-time CIR and EIR based scheduling.

According to embodiments of the present invention a simple instant traffic load process generates and applies a shaping rate result to the scheduler to achieve proportional fairness encompassing CIR and EIR using very little hardware and software resources. This real time calculator of shaping rates for each channel of a port can be computed with minimum computation cost and resources.

To manage the scheduling of traffic according to the embodiments of the invention, the process monitors the state of each channel queue. Specifically, two channel states are tracked an active state and an excess state. A queue is active or not active dependent on whether there are any packets in the queue (i.e., whether the queue is empty or not empty). Similarly, the queue is excess or not excess dependent on the number of packets in the queue or whether the packets cross a depth threshold. This is an indicator of congestion on that channel of the port.

In concept, once packets start to backup in a queue (crossing the threshold), it means the channel is congested. There is a configuration assumption that the aggregate CIR across all channels does not exceed port bandwidth. If a channel is passing traffic below CIR, it is guaranteed not to be backed up in the queue. A channel then gets congested only if it passes traffic at a rate higher than CIR and when the port is congested too, or when the channel reaches EIR.

The following definitions are provided for one embodiment of the invention:
A—available port bandwidth, initialized to 1. (port load value)
E—excess port bandwidth over committed load, initialized to 0. (port excess value)
L—channel committed rate CIR.
H—channel excess rate EIR.

A port load value (A) is tracked, which tracks an overall traffic load on a port. For each channel that is in the active state, the channel puts a load of CIR to the port. The channel load from a single channel on a port is the CIR (L). The aggregate of the load from all channels can be expressed by $(1-A)$. If the channel is crossing the threshold (i.e., it is in the excess state), the channel puts a load of EIR to the port, and we track this by using the port excess value (E).

A real-time calculation can be performed by a network element processor to track the port load value and port excess value:
When a channel goes active: $A=A-L$
When a channel goes inactive: $A=A+L$
When a channel goes excess: $E=E+(H-L)$
When a channel goes under-excess: $E=E-(H-L)$ Here $(1-A)$ reflects the committed bandwidth across all active channels and (E) reflects the excess load over committed rate on the whole port. To obtain proportional bandwidth sharing the process spreads the excess demand of port excess value (E) to the available bandwidth of the port load value (A). This spreading can be expressed as an oversubscription ratio (R), where $R=E/A$. In the case where the port excess value (E) is exceeded by the port load value (A) the oversubscription ratio can be set to 1. For each channel the shaping rate can then be represented by S where:
S—channel shaping rate, initialize to H.

At real time, the channel shaping rate calculation can be expressed as:

$$S=(H-L)/R+L$$

Figure 1:
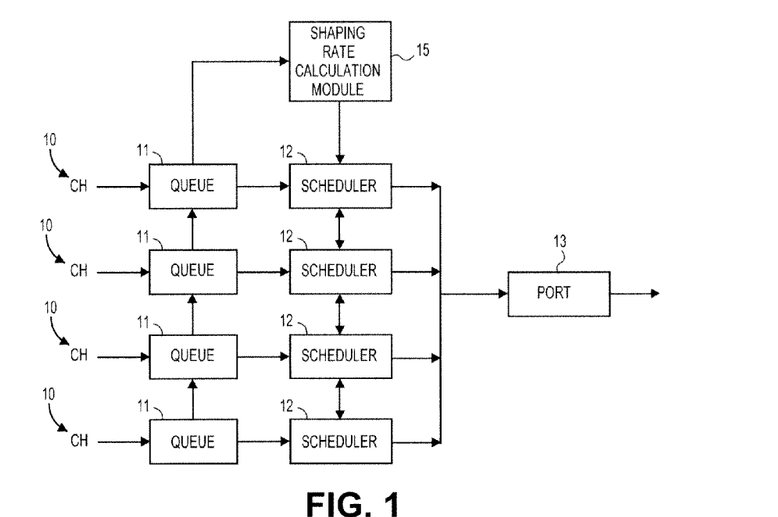
FIG. 1 is a simplified block diagram of a packet scheduler according to one embodiment of the invention.

FIG. 1 shows an embodiment of a simplified scheduler configuration to which scheduling has been added using the shaping rate, port load and port excess values discussed above. FIG. 1 has a set of incoming channels 10. The channels can be associated with different users, different enterprises, different sessions, or different communication demands from any user. In one example embodiment, each channel corresponds to a Permanent Virtual Circuit (PVC). Each channel is coupled to a queue 11 in which packets from the channel are buffered until they can be routed through the port 13. Each queue is coupled to a scheduler 12 between each respective queue and the port. The scheduler shapes the traffic based on the capacity of the port and any other desired factors, including the speed that has been allocated to the particular channel, the Quality of Service (QoS) for each channel, the type of packet in the queue and other factors. The schedulers 12 can implement any type of token-bucket based shaper process such as a deficit-round robin scheduler to implement the scheduling based on the shaping rate generated by the shaping rate calculation module 15.

The activity in each queue 11 is monitored by a shaping rate calculation module 15 which is coupled to each scheduler 12 to provide the scheduler with a channel specific shaping rate for the traffic based on the activity in the queues including the excess state of the queues. The lines into and out of the shaping rate calculation module show computation and propagation paths.

Figure 2:
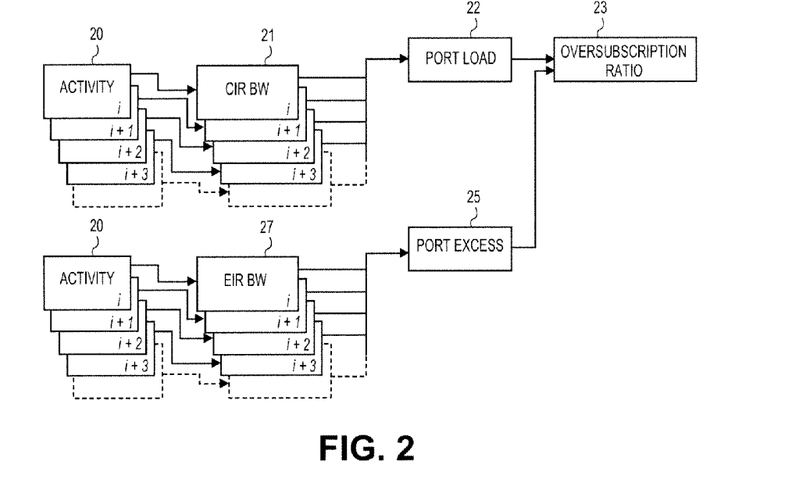
FIG. 2 is a simplified block diagram of logic to determine a shaping rate according to one embodiment of the invention.

FIG. 2 is a diagram of a portion of the shaping rate calculation module of FIG. 1 in more detail. A plurality of activity monitors 20 are coupled to corresponding CIR bandwidth register 21 or EIR bandwidth register 27. In this embodiment, there are two activity monitors 20 for each queue. The activity monitors 20 determine when a queue has changed from being empty or excess to not being empty or excess and when the queue has changed from being not empty or not excess to being empty or excess. For the case of a transition from empty to not empty, the activity monitors 20 associated with the queue generates a positive one value. In the case of a transition from not empty to empty, the activity monitor generates a negative one value. Similarly, for the case of a transition from excess to not excess, the activity monitor associated with the queue generates a positive one value. In the case of a transition from not excess to excess, the activity monitor generates a negative one value.

The generated values are applied to the corresponding CIR bandwidth register 21 or EIR bandwidth register 27, respectively. In the illustrated embodiment, there is one CIR and one EIR bandwidth register for each activity monitor and, correspondingly, for each queue. Each CIR bandwidth register stores the bandwidth allocation for the channel corresponding to the queue. Each EIR bandwidth register stores the excess bandwidth for the channel corresponding to the queue. When the generated values of the activity monitors 20 are applied to the respective CIR and EIR bandwidth registers, they are combined with the current CIR and EIR bandwidth register values and the result is applied to a port load register 22 for the CIR bandwidth register values and to a port excess register 25 for the EIR bandwidth register values. This causes the port load and port excess to be increased or decreased by the amount of the corresponding CIR or EIR bandwidth factor. The modified port load value and port excess value are then combined by dividing the port excess value by the port load value to write over an oversubscription ratio register 23. Additional operations may be performed to modify or adapt the oversubscription ratio for a particular adaptation.

In the embodiment of FIG. 1, the oversubscription ratio from the oversubscription ratio register 23 is used to generate a set of shaping rates by the shaping rate calculation module 15 according to the shaping rate calculation described above to be applied to the respective schedulers for each channel. This adjusts the transmission of packets to the port 13 and reduces or eliminates the congestion on the port 13. In this embodiment, an instant traffic load calculation is used for shaping packet transmission through the port 13. The global variables port load and port excess, as previously described, are used to track the port traffic load level and excess bandwidth, respectively, to arrive at an oversubscription ratio for the port that can then be used to generate separate shaping rates for each channel that cumulatively adjust the use of the ports' bandwidth such that the cumulative bandwidth usage of the ports maximizes the use of the ports available bandwidth in a manner that is proportionate to the allotted CIR and EIR of each channel.

Figure 3:
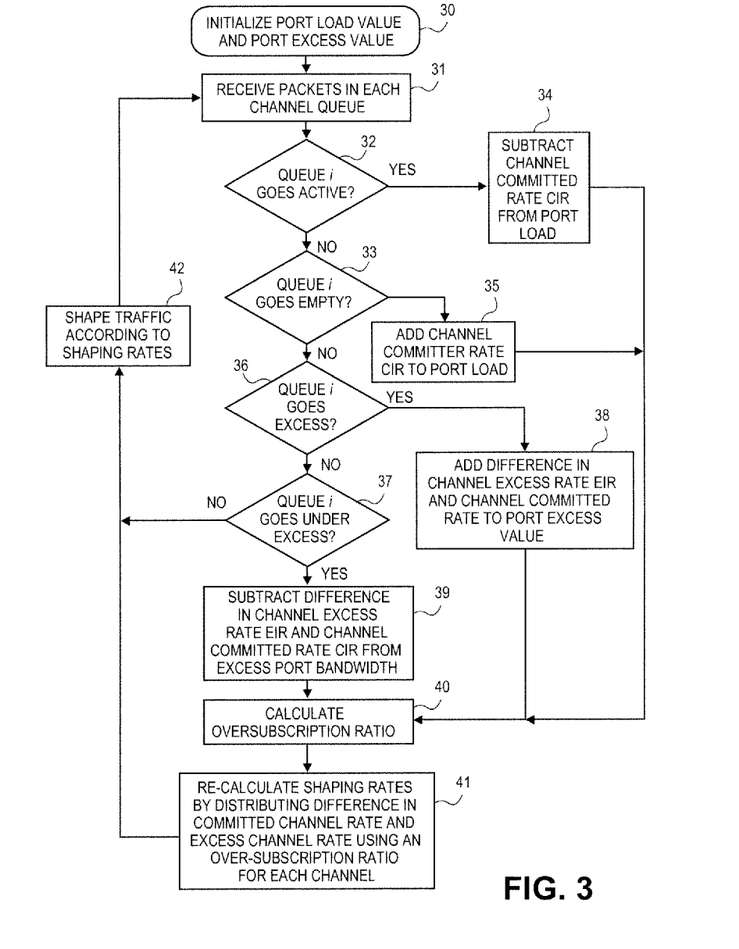
FIG. 3 is a process flow diagram of determining a shaping rate according to one embodiment of the invention.

FIG. 3 is a process flow diagram for the processes described above. The process of tracking and updating the port load value and port excess value can be initiated by initializing these values to a baseline or reference value (e.g., 0 or 1) (Block 30). Packets can then be received into one or more packet queues for transmission through a port of the network element (Block 31). While the description is presented in the context of packets, data can come in any of a variety of other forms and the techniques herein apply to any form of data that can be buffered in queues and scheduled. Activity monitors determine whether a queue goes active by having some packets added to the queue (Block 32). Activity monitors determine whether a queue goes empty from transmitting or processing packets in the queue (Block 33). If a queue goes active then, the CIR for this channel is subtracted from the port load value (Block 34). If a queue goes empty, then the CIR for the channel is added to the port load value. In this example, the baseline value for the port load value is 1. However, one skilled in the art would understand that other baseline values (e.g., zero) could be used in which case the CIR addition and subtraction steps would be inverted.

Activity monitors determine whether a queue goes excess by having some packets added to the queue that exceed a threshold value (Block 36). Activity monitors determine whether a queue goes non-excess or under excess from transmitting or processing packets in the queue to lower the number of packets below the threshold (Block 37). If a queue goes excess then, the difference between the CIR and EIR for this channel is added to the port excess value (Block 38). If a queue goes non-excess, then the difference between the CIR and EIR for the channel is subtracted from the port excess value (Block 39). In this example, the baseline value for the port load excess value is zero. However, one skilled in the art would understand that other baseline values (e.g., one) could be used in which case the addition and subtraction steps would be inverted.

If any of the queue states have changed then the oversubscription ratio is calculated using the adjusted port load value and/or port excess value (Block 40). The updated oversubscription ratio is then used to generate each channel's shaping rate by distributing the difference in CIR and EIR using the oversubscription ratio for each channel (Block 41). The shaping rates are then used to shape the traffic for each channel by each channel scheduler (Block 42).

A set of example cases are set forth below to illustrate the calculation of the shaping rates for channels of a port. In each case it is assumed that a port with 100 megabits of capacity is servicing 80 users where 75 of the users have a 1 megabit committed rate (CIR) and a 20 megabit max (EIR). Five of the users have a 5 megabit committed rate (CIR) and a 25 megabit max (EIR). The low bandwidth channels are represented as [1, 20] indicating the CIR and EIR tuple and the high bandwidth channels are represented as [5, 25] indicating the CIR and EIR tuple.

Case 1: 25 Active Users with Low Bandwidth (1 Megabit CIR) Channels:

In this case it is assumed that the 25 low-bandwidth channels are passing traffic at 20 megabits each. The numbers in the shaping rate calculation process then look like:

$CIR[1,20]=0.01$—low-bandwidth channel CIR
$EIR[1,20]=0.2$—low-bandwidth channel EIR
$A=(1-25*0.01)=0.75$.—available bandwidth over aggregate CIR on port
$E=25*(0.2-0.01)=4.75$.—excess demand
$R=E/A=6.333$.—oversubscription ratio
$S[1,20]=(H-L)/R+L=(20-1)/6.333+1=4M$—low bandwidth channel shaping rate
$S[5,25]=(H-L)/R+L=(25-5)/6.333+5=8.15M$—high-bandwidth channel shaping rate.

Since there is no traffic on the [5,25] channels, aggregate traffic after shaping is $25*4M=100M$.

Case 2: Add 5M Traffic to One of the High Bandwidth Channels to Case 1

In case 1, the high bandwidth channels were shaped to 8.15M, but there was not actual traffic. In this case, one high bandwidth channel receives some traffic and the shaping rate will be different. It is assumed that one of the high bandwidth users has become active and starts to send traffic at 5M.

The numbers shaping rate calculation process then look like:
$CIR[1,20]=0.01$
$EIR[1,20]=0.2$
$CIR[5,25]=0.05$
$A=(1-25*0.01-1*0.05)=0.70$.

$E=25*(0.2-0.01)=4.75$.—high bandwidth queue is not crossing threshold, it is just at 5M CIR
$R=E/A=4.75/0.70=6.7857$.
$S[1,20]=(H-L)/R+L=(20-1)/6.7857+1=3.8000M$—low shaping rate
$S[5,25]=(H-L)/R+L=(25-5)/6.7857+5=7.9474M$—hi shaping rate.
Total port traffic is $25*3.8+5=100M$.

Case 3: Add More Traffic to the One High-Bandwidth Channel Till its Queue Crosses the Threshold In this case all the channels are congested as the high bandwidth channel, which brings the EIR of the high bandwidth channel into the process.
$CIR[1,20]=0.01$
$EIR[1,20]=0.2$
$CIR[5,25]=0.05$—high bandwidth channel CIR
$EIR[5,25]=0.25$—high bandwidth channel EIR
$A=(1-25*0.01-1*0.05)=0.70$.
$E=25*(0.2-0.01)+1*(0.25-0.05)=4.95$.—high bandwidth queue crossed threshold
$R=E/A=7.0714$.
$S[1,20]=(H-L)/R+L=(20-1)/7.0714+1=3.6869M$—low shaping rate
$S[5,25]=(H-L)/R+L=(25-5)/7.0714+5=7.8283M$—hi shaping rate.
Total port traffic is $25*3.6869+7.8283=100.0008$. If R is rounded up and S down, $R=7.0715$, $S[1,20]=3.6868$, $S[5,25]=7.8282$, total=99.9982.

Figure 4:
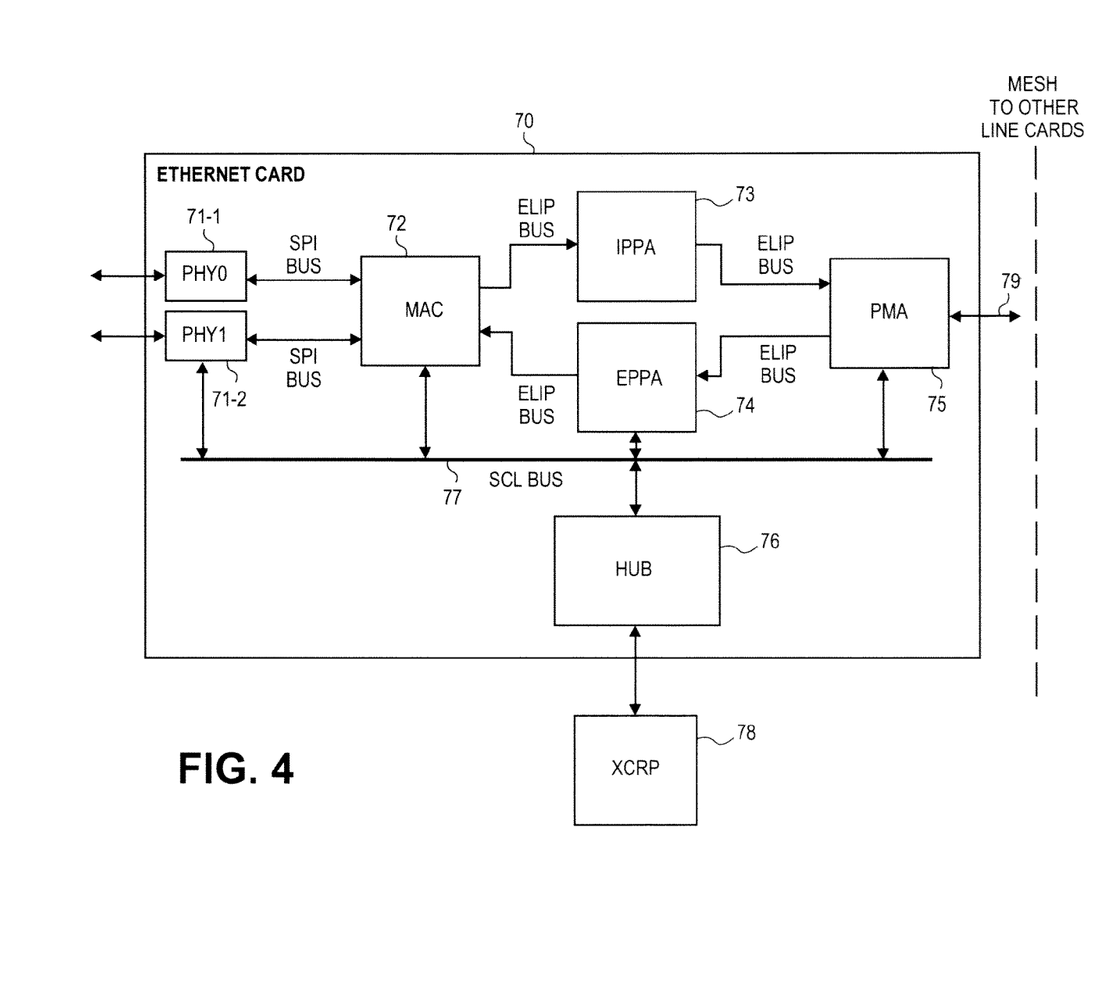
FIG. 4 is a block diagram of a line card suitable for implementing any one or more of the schedulers of the described embodiments of the invention.

FIG. 4 shows an example of a line card 70 suitable for implementing the scheduling and shaping of any one or more of the embodiments of the invention discussed above. The line card of FIG. 4 includes two physical layer interfaces 71-1, 71-2, in the form of front end line interface chips, labeled PHY0, and PHY1. The PHY chips provide an interface for the channels and the port described above. The PHY chips are coupled through a serial peripheral interface (SPI) bus to a media access control (MAC) device 72. In other embodiments, the PHY chips are coupled to the MAC device through a gigabit media independent interface (GMII) bus, or serial gigabit media independent interface (SGMII) bus or similar interface bus. The MAC device 72 is coupled through an enhanced line interface protocol (ELIP) bus to packet processor such as an Ingress Packet Processing ASIC (Application Specific Integrated Circuit) (IPPA) 73 to buffer, schedule and scale incoming packets and also to a packet processor such as an Egress Packet Processing ASIC (EPPA) 74 to buffer and schedule outgoing traffic through the port.

The IPPA and EPPA are coupled to the mesh or backplane to other line cards through a fabric interface such as a Packet Mesh ASIC (PMA) 75. Each of the components can also be connected through a serial control link (SCL) bus 77 including each PHY device 71-1 and 71-2 and each PPA device 73 and 74. An external cross connect route processor (XCRP) 78 can be connected to the components of the card through an SCL hub 76 to provide configuration for each of the components of the card.

The architecture shown in FIG. 4 is particularly suitable for Ethernet and embodiments of the invention may be applied to other types of system architectures and other protocols. In the embodiment of FIG. 4, packets can be routed through the PHY interfaces 71 or through the PMA 75 to other line cards and then through PHY interfaces of other line cards. The PHY interfaces may be different on different line cards. The port referred to above may be on the PHY interfaces or on the fabric or backplane interface. The logic operations described above may be performed in the IPPA, the EPPA, and the processor and controlled locally in the local processor or by the remote processor, depending on the particular implementation.

Figure 5:
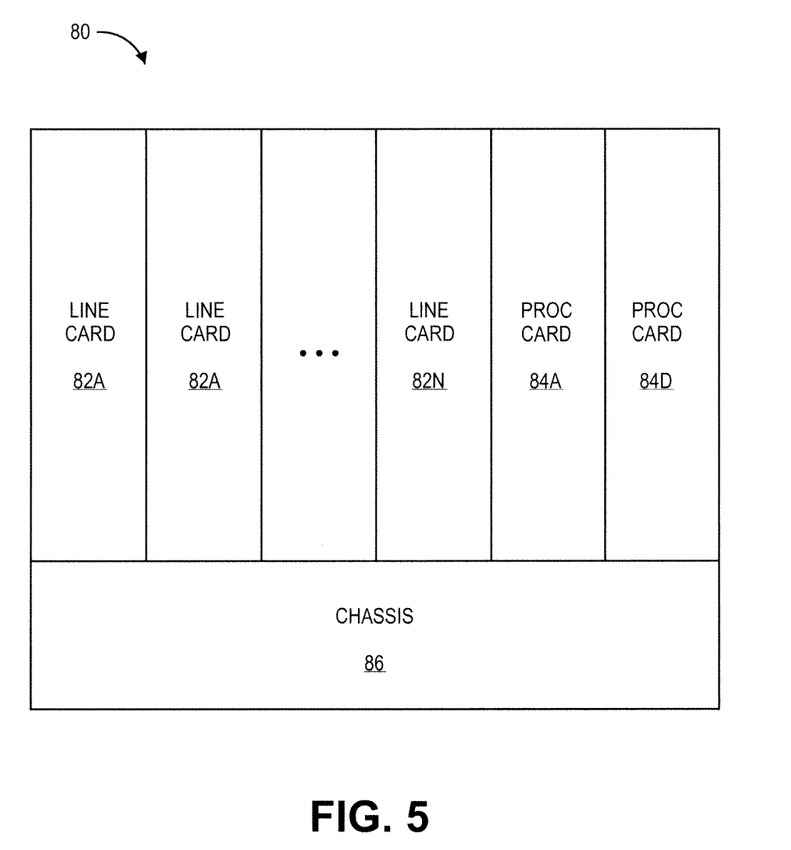
FIG. 5 is a block diagram of a network element capable of carrying the line card of FIG. 4 according to an embodiment of the invention.

FIG. 5 is a block diagram illustrating a network element 80 capable of carrying the line card of FIG. 4 together with other line cards and the mesh to interconnect them. The Ethernet card of FIG. 5 is represented as a line card in FIG. 5. In one embodiment of the invention a chassis 86 is coupled to a group of N line cards 82A-N and processing cards 84A-B. Additional and other types of devices (not shown) may be coupled to the chassis 86. Traffic shaping processes can be a part of the line cards 82A-N and/or the processing cards 84A-B, alternate embodiments can have alternate card arrangements (e.g., combined line and processing cards with one or more ports and a forwarding engine, one processing card per line card, multiple processing cards per line card, etc.). The network element 80 includes line cards 82A-N to forward packets.

This implementation of the traffic shaping module is shown as an example, and not by way of limitation. Thus, network elements having other architectural configurations can incorporate embodiments of the invention. Examples of other network elements that could incorporate embodiments of the invention could have multiple forwarding cards or have a single line card incorporating the functionality of both the forwarding and the controlling. Moreover, a network element having the forwarding functionality distributed across the traffic cards could incorporate embodiments of the invention.

The traffic shaping module cards in the form of line cards 82A-N, and processor cards 84A-B included in the different network elements include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term non-transitory "machine-readable medium" shall be taken to include any mechanism that provides (i.e., stores and/or transmits) information in a form readable by a machine (e.g., a computer). For example, a non-transitory machine-readable storage medium includes read only memory (ROM); random access memory (RAM); magnetic disk storage media; optical storage media; flash memory devices); while a transitory machine-readable communication medium include electrical, optical, acoustical or other form of propagated signals (e.g., carrier waves, infrared signals, digital signals, etc.)

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network element to shape packet traffic rates of packets in-transit from a plurality of channels to a port within the network element, the port shared by the plurality of channels for transmitting the packets, the method comprising the steps of:
   initializing a port load value and port excess value for the port, the port load value to track load for the port across the plurality of channels and the port excess value to track use of bandwidth on the port between a committed information rate (CIR) and an excess information rate (EIR) across the plurality of channels;
   receiving packets through each of the plurality of channels and storing the received packets in a respective queue for each channel;
   monitoring a status of each queue as empty or not empty;
   monitoring a status of each queue as excess or not excess, wherein excess is a state where a threshold number of packets has been stored in a queue for a channel;
   subtracting a CIR from the port load value when an empty queue becomes active by storing at least one packet;
   adding the CIR to the port load value when an active queue becomes empty;
   adding a difference between an EIR and the CIR for a channel to the port excess value when a queue of the channel becomes excess by meeting the threshold number;
   subtracting the difference between the EIR and the CIR for the channel from the port excess value when the excess queue for the channel becomes not excess;
   calculating an oversubscription ratio based on the port load value and port excess value;
   calculating a shaping rate for each of the plurality of channels by distributing a difference in CIR and EIR for a port across the plurality of channels by applying an over-subscription ratio for each channel; and
   shaping the traffic for each of the plurality channels using the shaping rate for bandwidth allocation.

2. The method of claim 1, further comprises the step of:
   re-calculating the shaping rate based on changes in active and excess queue states for the plurality of channels.

3. The method of claim 1, wherein the bandwidth allocation for each channel is proportionate to the EIR and CIR values of each channel.

4. The method of claim 1, wherein calculating the over-subscription ratio for each channel divides the port excess value by the port load value.

5. The method of claim 4, wherein calculating the shaping rate for a channel further comprises the steps of:
   adding the CIR to a division of a difference between the EIR and the CIR for the port by the over-subscription ratio.

6. The method of claim 1, wherein shaping a traffic rate for a channel comprises adding credits to a record corresponding to a queue, wherein a scheduler shapes traffic for each queue through the port based on the credits for the respective queue.

7. A network element to shape packet traffic rates of packets in-transit from a plurality of channels to a port within the network element, the port shared by the plurality of channels for transmitting the packets, the network element comprising:
   a plurality of channel interfaces to receive packets;
   a plurality of packet queues coupled respectively to each channel interface to buffer packets received at the channel interfaces;
   a port coupled to the queues to transmit received packets from the queues; and
   a shape rate calculation module to initialize a port load value and port excess value for the port, the port load value to track load for the port across the plurality of channels and the port excess value to track use of bandwidth on the port between a committed information rate (CIR) and an excess information rate (EIR) across the plurality of channels, the shape rate calculation module to monitor a status of each queue as empty or not empty, to monitor to a status of each queue as excess or not excess, to subtract a CIR from the port load value when an empty queue becomes active by not being empty, to add the CIR to the port load value when an active queue becomes empty, to add a difference between an EIR and the CIR to the port excess value when an queue becomes excess by meeting the threshold number, to subtract the difference between the EIR and the CIR from the port excess value when an excess queue becomes not excess, and to calculating a shaping rate for each of the plurality of channels by distributing a difference in CIR and EIR for a port across the plurality of channels by applying an over-subscription ratio for each channel; and a scheduler to shape the traffic for each of the plurality channels using the shaping rate for bandwidth allocation.

8. The network element of claim 7, wherein the shape rate calculation module re-calculates the shaping rate based on changes in active and excess queue states for the plurality of channels.

9. The network element of claim 7, wherein the bandwidth allocation for each channel is proportionate to the EIR and CIR values of each channel.

10. The network element of claim 1, wherein the shape rate calculation module calculates the over-subscription ratio for each channel by dividing the port excess value by the port load value.

11. The network element of claim 10, wherein the shape rate calculation module calculates the shaping rate for a channel by adding the CIR to a division of a difference between the EIR and the CIR for the port by the over-subscription ratio.

12. The network element of claim 7, wherein the scheduler shapes a traffic rate for a channel by adding credits to a record corresponding to a queue, wherein the scheduler shapes traffic for the queue through the port based on credits for the queue.

13. The network element of claim 12, wherein the scheduler is one of a plurality of schedulers each to shape traffic for a separate queue through the port based on credits for a respective queue.

* * * * *